US008404041B2

(12) United States Patent
Raki et al.

(10) Patent No.: US 8,404,041 B2
(45) Date of Patent: *Mar. 26, 2013

(54) CONTROLLED RELEASE OF CHEMICAL ADMIXTURES

(75) Inventors: Laila Raki, Gloucester (CA); James J. Beaudoin, Gloucester (CA)

(73) Assignee: National Research Council of Canada, Ottawa, ON (CA)

(*) Notice: Subject to any disclaimer, the term of this patent is extended or adjusted under 35 U.S.C. 154(b) by 106 days.

This patent is subject to a terminal disclaimer.

(21) Appl. No.: 12/970,147

(22) Filed: Dec. 16, 2010

(65) Prior Publication Data

US 2011/0083586 A1 Apr. 14, 2011

Related U.S. Application Data

(63) Continuation of application No. 11/493,675, filed on Jul. 27, 2006, now Pat. No. 7,879,146.

(60) Provisional application No. 60/703,895, filed on Aug. 1, 2005.

(51) Int. Cl.
C04B 40/00 (2006.01)
C04B 16/00 (2006.01)
C04B 24/00 (2006.01)
C04B 24/10 (2006.01)

(52) U.S. Cl. .................. 106/819; 106/802; 106/803

(58) Field of Classification Search .............. 106/802, 106/803, 806, 819; 166/293
See application file for complete search history.

(56) References Cited

U.S. PATENT DOCUMENTS

| | | | |
|---|---|---|---|
| 4,028,125 A | 6/1977 | Martin | |
| 4,210,457 A | 7/1980 | Dodson et al. | |
| 4,351,814 A | 9/1982 | Miyata et al. | |
| 5,320,851 A | 6/1994 | de Mars et al. | |
| 5,435,846 A | 7/1995 | Tatematsu et al. | |
| 5,453,123 A | 9/1995 | Burge et al. | |
| 5,478,521 A | 12/1995 | Scheiner | |
| 5,613,558 A | 3/1997 | Dillenbeck, III | |
| 5,658,380 A | 8/1997 | Dillenbeck, III | |
| 5,753,744 A | 5/1998 | Darwin et al. | |
| 5,876,738 A | 3/1999 | Ohno et al. | |
| 6,209,646 B1 | 4/2001 | Reddy et al. | |
| 6,264,737 B1 | 7/2001 | Liotta, Jr. et al. | |
| 6,525,005 B1 | 2/2003 | Kravitz et al. | |
| 6,761,220 B2 | 7/2004 | Blauch et al. | |
| 6,767,867 B2 | 7/2004 | Chatterji et al. | |
| 7,879,146 B2 * | 2/2011 | Raki et al. .................. 106/819 |
| 2002/0173562 A1 | 11/2002 | Flores | |
| 2003/0131759 A1 | 7/2003 | Francis et al. | |
| 2007/0022916 A1 | 2/2007 | Raki et al. | |

FOREIGN PATENT DOCUMENTS

| | | | |
|---|---|---|---|
| CA | 2481273 | | 1/2004 |
| JP | 9-14903 | * | 6/1997 |
| JP | 9-142903 | | 6/1997 |
| JP | 2001-089211 | | 4/2001 |

OTHER PUBLICATIONS

Office Action dated May 20, 2009 on U.S. Appl. No. 11/493,675.

(Continued)

*Primary Examiner* — Pegah Parvini
(74) *Attorney, Agent, or Firm* — Jason E. Davis

(57) ABSTRACT

A method of controlling release of an admixture in a cement-based composition involves intercalating an admixture (e.g. an accelerator, a set retarder, a superplasticizer) for the cement-based composition into a layered double hydroxide or mixture thereof. A cement-based composition prepared in such a manner and containing a cement-based material (e.g. cement, mortar or concrete) has better workability, especially in respect of slump-loss characteristics.

16 Claims, 12 Drawing Sheets

OTHER PUBLICATIONS

Final Office Action dated Sep. 3, 2009 on U.S. Appl. No. 11/493,675.
Office Action dated Jan. 6, 2010 on U.S. Appl. No. 11/493,675.
Office Action dated Jun. 22, 2010 on U.S. Appl. No. 11/493,675.
Jimenez-Sanchidrian, C. et al. The Baeyer-Villiger reaction on heterogeneous catalysts. Tetrahedron. 64, 2011-2026 (2008).
van Laar, F.M.P.R., et al. Generation of Singlet Molecular Oxygen from H2O2 with Molybdate-Exchanged Layered Double Hydroxides: Effects of Catalyst Composition and Reaction Conditions. Journal of Catalysis. 197, 139-150 (2001).
Prihodko, R., et al. Layered double hydroxides as catalysts for aromatic nitrile hydrolysis. Microporous and Mesoporous Materials 56, 241-255 (2002).
Ueno, S. et al. The active sites in the heterogeneous Baeyer-Villiger oxidation of cyclopentanone by hydrotalcite catalysts. Applied Surface Science 121/122, 366-371 (1997).
Chibwe et al. J. Chem Soc., Chem. Commun. 14, 926-927 (1989).
Uchikawa et al. Cement and Concrete research. 25(2), 353-364 (1995).
Flatt et al. Cement and Concrete Research. 31, 1169-1176 (2001).
Choy et al. Biomaterials. 25, 3059-3064 (2004).
Makoto et al. Espacenet Abstract of JP 11100246, Apr. 13, 2004.
CIPO Office Action dated Feb. 28, 2012, National Research Council of Canada, 2,554,347.

\* cited by examiner

CONTROLLED RELEASE OF CHEMICAL ADMIXTURES

CROSS-REFERENCE TO RELATED APPLICATIONS

This application claims the benefit of U.S. patent application U.S. Ser. No. 60/703,895 filed Aug. 1, 2005, and is a continuation of U.S. patent application U.S. Ser. No. 11/493,675 filed Jul. 27, 2006 and issued under U.S. Pat. No. 7,879,146 on Feb. 1, 2011, which is herein incorporated by reference.

FIELD OF THE INVENTION

The present invention is related to control of admixture release in compositions, especially in cement-based compositions.

BACKGROUND OF THE INVENTION

Control of admixture action in concrete and other materials is limited by the methods and timing of delivery. Admixtures are most often added at time of mixing, which is not necessarily optimal for the desired chemical effects. For instance, it is sometime desirable to delay release of compounds such as superplasticizers, retarders, accelerators, and other additives.

The prior art describes "encapsulation" procedures for delivery of chemicals. Such procedures often rely on mechanisms involving dissolution (coating), diffusion (membranes), desorption (porous materials), and mechanical dispersion (during mixing), which are expensive and time-consuming.

Pronounced anion exchange capacity of LDHs and LDH-like materials makes interlamellar ion exchange by organic and inorganic anions versatile and easy. LDHs have been investigated extensively in a wide range of applications such as catalysts, ceramic precursors, adsorbents, bio-organic nanohybrids, and also as scavengers of pollutant metals and anions. Recent research has shown great flexibility of the anionic clays in tailoring chemical and physical properties of materials to be used for specific application, e. g. molecular recognition, optical storage, batteries, etc. Furthermore, by introducing various transition and noble metals into the sheets of the LDH structure, researchers have been able to produce catalyst precursors. More recently, there have been a tremendous number of new developments using a LDH as a matrix for storage and delivery of biomedical molecules and as a gene carrier.

Development of new inexpensive materials for programmed delivery and action control of admixtures in cement-based compositions would present a significant technological advance.

SUMMARY OF THE INVENTION

In one aspect of the invention, there is provided a controlled release formulation for a cement-based composition comprising a layered inorganic material and an admixture for the cement-based composition.

In another aspect of the invention, there is provided a cement-based composition comprising: a cement-based material; and, a controlled release formulation comprising a layered inorganic material and an admixture for the cement-based composition.

In yet another aspect of the invention, there is provided a method for controlling release of an admixture in a cement-based composition comprising intercalating the admixture into a layered inorganic material to form a controlled release formulation and adding the controlled release formulation to a cement-based material.

The present invention provides a nano-technology approach to control delivery of admixtures in cement-based compositions. De-intercalation or release of the admixture can be actively programmed through controlled chemistry involving, for example, type of layered inorganic material, charge density, concentration, and/or pH. The admixture may be an organic or an inorganic species. Layered double hydroxides (LDHs) in which organic admixtures are intercalated are particularly efficacious.

The present invention allows in situ real-time delivery of admixtures to cement-based compositions. The performance of admixtures and cement-based products containing them can be enhanced, for example, improved modulation of slump loss of cement-based compositions may be achieved. The present invention thus provides an effective and controllable method of releasing admixtures into cement-based compositions.

Layered inorganic materials preferably comprise naturally occurring hydrotalcite ($Mg_6Al_2(OH)_{16}CO_3 \cdot 4H_2O$), a layered double hydroxide (LDH), or a mixture thereof. The layered inorganic material preferably comprises a layered double hydroxide or mixture thereof. The layered double hydroxide preferably comprises a synthetic LDH or mixture thereof.

LDHs are structurally related to brucite, $Mg(OH)_2$, the same way AFm phases are to Portlandite. Structurally, a layered double hydroxide (LDH) is similar to brucite, $Mg(OH)_2$, with the replacement of some $Mg^{2+}$ cations by trivalent ions. Excess positive charge is neutralized by interlayer anions.

LDHs are preferably compounds of formula (I):

$$[M^{2+}_{1-x}M^{3+}_x(OH)_2]^{2+}[A^{n-}_{x/n} \cdot mH_2O]^{x-} \qquad (I)$$

where $M^{2+}$ is a divalent metal cation, $M^{3+}$ is a trivalent metal cation, $An^-$ is an anion, x is a number from 0 to 1 but not 0, n is a number 1 or greater, and m is a number 0 or greater.

$M^{2+}$ and $M^{3+}$ are such that their ionic radii can be accommodated within an octahedral configuration of OH groups. $M^{2+}$ is preferably $Ni^{2+}$, $Zn^{2+}$, $Mn^{2+}$, $Ca^{2+}$, or a mixture thereof. $M^{3+}$ is preferably $Al^{3+}$, $Ga^{3+}$, $Fe^{3+}$, $Cr^{3+}$, or a mixture thereof. The number x is a molar ratio defined by $M^{3+}/(M^{2+}+M^{3+})$, and preferably is in a range of from about 0.1 to 0.5, which corresponds to a layer charge density of from about 2 to 4 positive charges per $nm^2$. More preferably, $0.2 \leq x \leq 0.33$. Particularly preferred values of x are 0.25 and 0.33, corresponding to charge densities of 33.5 Å/charge and 25 Å/charge, respectively.

$A^{n-}$ is an anion that compensates for excess positive charge induced by $M^{3+}$ substitution of $M^{2+}$. $A^{n-}$ may be small or bulk organic or inorganic molecules or layered materials. Preferably, $A^{n-}$ is an inorganic anion, more preferably $NO_3^-$, $Cl^-$, $CO_3^{2-}$, $SO_4^{2-}$ or a mixture thereof. The number n is preferably a number from 1 to 4.

The number m defines an amount of water localized in the interlamellar space of the LDH, and depends on size and charge of the anion $A^{n-}$, on relative humidity and on x.

An LDH may be built up from brucite, $Mg(OH)_2$, by isomorphous substitution of divalent cations. $Mg^{2+}$ ions may be replaced by $M^{3+}$ ions and/or other $M^{2+}$ ions. Replacement of $Mg^{2+}$ by $M^{3+}$ ions generates an excess of positive charge within the inorganic layers, which has to be balanced by incorporation in the interlayer space of anions, i.e. $A^{n-}$. In addition to anions, the interlayer space region can also contain water molecules connected to the inorganic layers via hydrogen bonding.

LDHs may also be prepared by co-precipitation methods using $M^{2+}$ and $M^{3+}$ sources at constant pH under basic conditions. In co-precipitation methods, the pH is generally higher than or equal to the pH at which the more soluble metal hydroxide precipitates. Preferably, the pH is in a range of from about 8 to 10. Their high anion exchange capacity (2.4 to 4.1 milliequivalents per gram) makes the interlamellar ion exchange by organic and inorganic anions versatile and easily achieved.

The admixture for cement-based composition may be one or more organic and/or inorganic molecules, and may comprise small molecules, polymers or mixtures thereof. Preferably, the admixture comprises an accelerator for reducing set time, a retarder for delaying set time, a superplasticizer, an air-entraining agent for freeze-thaw resistance, a corrosion inhibitor, an expansive admixture for minimizing shrinkage, a shrinkage reducing admixture, a water repelling admixture, a water reducer (including high-range water reducers), an alkali-aggregate reaction inhibitor (e.g. lithium-based salts), or a mixture thereof. Preferably, the admixture comprises an organic molecule.

Controlled release formulations may be prepared by intercalating an admixture in the layered inorganic material, for example by anion exchange. This method has been widely explored and used in fields of LDH applications such as catalysis, optical materials, separation science, and medicine. LDHs have greater anion exchange capacities (about 2.4 to 4.1 milliequivalents per gram) compared with cation exchange capacities (about 0.7 to 1.0 milliequivalents per gram) in conventional clays such as montmorillonite. The anion exchange sequence in LDHs is as follows: $CO_3^{2-} \gg SO_4^{2-} \gg OH^- > F^- > Cl^- > Br^- > NO_3^- > I^-$. Layered hybrid organic-inorganic materials may be obtained via an ion exchange reaction of interlayer ions, preferably nitrates, of the layered host materials with guest anions. Concentration of the admixture in the layered inorganic material has an impact on performance of the formulation. Preferably, the concentration is within a range of about 0.05-1 M, for example in a range of about 0.5-0.7 M (e.g. 0.5 M and 0.7 M).

Cement-based materials include cement, mortar, concrete, etc. Cement is generally formulated by mixing water with dry powder cementitious material. Mortar is generally formulated by mixing water with dry powder cementitious material and fine aggregate (e.g. sand). Concrete is generally formulated by mixing water with dry powder cementitious material and both fine aggregate (e.g. sand) and coarse aggregate (e.g. stone). Cementitious material includes, for example, Portland cement, high alumina cement, magnesium phosphate cement, gypsum, etc., or mixtures thereof. Other inorganic chemical admixtures may be present in the cement-based composition, for example, pozzolanic materials (e.g. fly ash, slag, silica fume, lime, etc., or mixtures thereof) to supplement or replace cementitious materials.

Cement-based compositions may be produced by adding, preferably with mixing, a controlled release formulation of the present invention to a cement-based material. The controlled release formulation may be added together with a cementitious material (and aggregate if desired) to water, preferably with mixing, to form the cement-based composition. Time and method of introduction of the controlled release formulation in the cement-based composition has an impact on performance. Preferably, the controlled release formulation is first added to the cementitious material to form a mixture, followed by addition of water to the mixture. Water-cement ratio (w/c) of the cement-based material is preferably about 0.1-10, for example 0.3-0.5 (e.g. 0.3, 0.4 or 0.5). The controlled release formulation is preferably present in the cement-based composition in an amount from about 0.2% to about 10%, more preferably about 1% to about 5%, for example about 3.5% to about 3.7%, based on mass of cement.

Release of molecules from the interlamellar space of an LDH depends on acid-base reaction pH values. Since cement pore solution is a basic medium, pH of the cement-based material is preferably in a range of 12-14. At lower pH values release of molecules is slower.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

EXAMPLES

Figure 1:
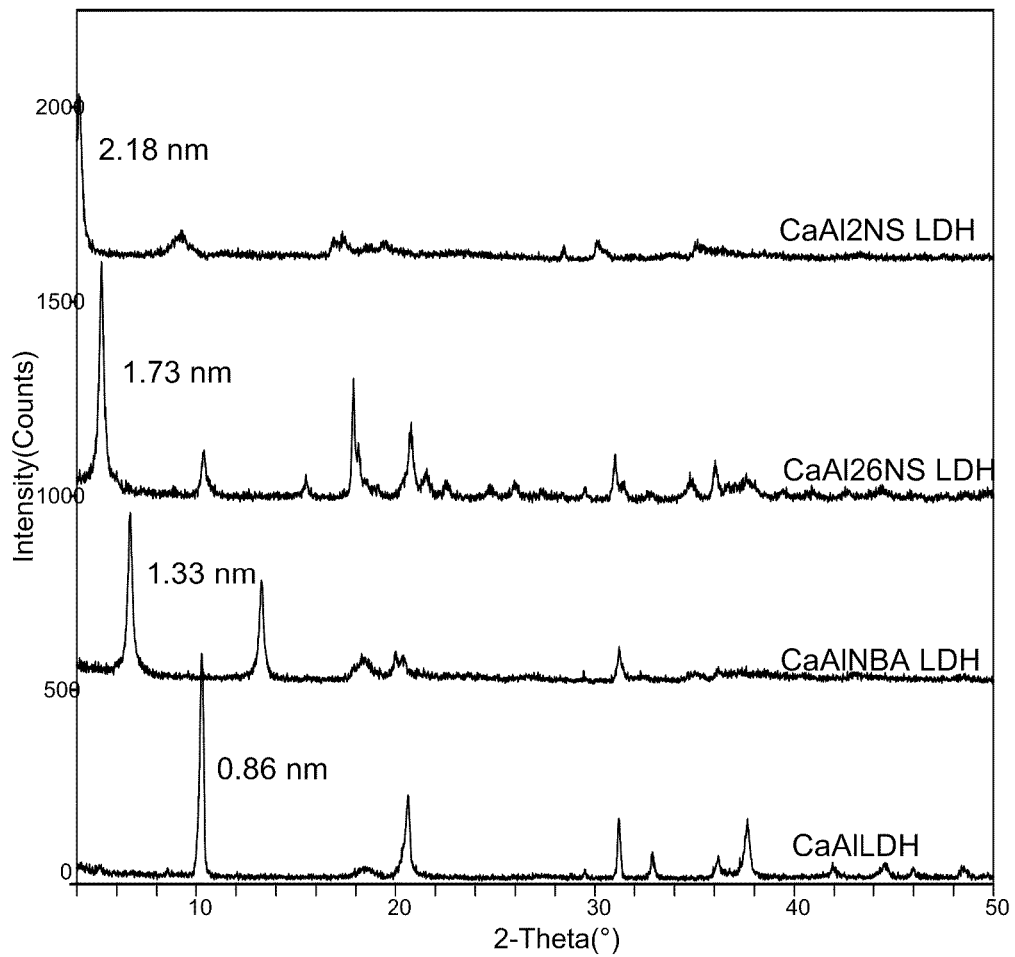
FIG. 1 depicts X-ray diffraction (XRD) patterns for a synthetic CaAl LDH and for synthetic CaAl LDH having organic molecules intercalated therein.

In the Examples, a series of controlled release formulations have been developed and tested using a number of analytical and engineering techniques. X-ray diffraction (XRD), thermogravimetric analysis (TGA), infrared spectroscopy (IR), scanning electron microscopy (SEM), X-ray fluorescence (XRF), and nuclear magnetic resonance (NMR) were used to characterize the controlled release formulations. Conduction calorimetry (CC) was used to study the effect of controlled release formulations on the hydration kinetics of cement phases. Rheological properties/changes of paste, mortar and concrete were studied by analysing the effectiveness of the controlled release formulations in controlling the slump-loss versus time characteristic.

Materials:

All reactions were carried out using reagent grade chemicals (>98% purity) obtained from Sigma-Aldrich and Fisher Scientific without further purification. Deionized distilled water was used for the preparation of aqueous solutions.

Organic admixtures were: ortho, para and meta nitrobenzoic acid salts; ortho, para and meta aminobenzoic acid salts; naphthalene-2,6-disulfonate; naphthalene-2-sulfonate; salicylic acid salt; citric acid salt; benzene sulfonic acid salt; polyacrylic acid salts, polyvinyl alcohol; and Disal™ (a poly naphthalene sulfonate sodium salt superplasticizer).

Divalent metal ($M^{2+}$) salts including $Ca(NO_3)_2.4H_2O$ and $Zn(NO_3)_2.6H_2O$, and trivalent metal ($M^{3+}$) salts including $Al(NO_3)_3.9H_2O$ and $Fe(NO_3)_3.9H_2O$ were used in the presence of sodium hydroxide (NaOH) and sodium nitrate ($NaNO_3$) at $M^{2+}/M^{3+}=2$ and 3.

Development of controlled release formulations was achieved in two steps: synthesis of an $M^{2+}$-$M^{3+}$-based LDH material with exchangeable anions such as nitrates, hydroxides, chlorides, etc.; and, intercalation of organic molecules within the LDH material by anion exchange. A typical procedure is described in Example 1.

Example 1

Preparation of Controlled Release Formulations

Preparation of a CaAl LDH

A CaAl LDH was prepared by a pH controlled co-precipitation technique of the corresponding metal nitrate salts at room temperature. Typically, a solution containing 0.28 moles of $Ca(NO_3)_2.4H_2O$ and 0.12 moles of $Al(NO_3)_3.9H_2O$ in 320 ml of distilled water was added drop wise to a solution containing 0.6 moles of NaOH and 0.4 moles of $NaNO_3$. The pH of the final mixture was 9.6. The suspension was heated for 16 h at 65° C. with vigorous stirring, after which the solid precipitate was collected by filtration and washed thoroughly with distilled water several times and then with acetone. The cake-like material was then dried 16 h at 100° C. in vacuum.

Intercalation of an organic molecule in CaAl LDH

Intercalation reactions of organic molecules were performed using anion exchange reactions known in the art. The reactions were carried out under nitrogen to avoid contamination with carbonates from the atmosphere. CaAlNBA LDH, CaAl26NS LDH, and CaAl2NS LDH were obtained by anion exchange of nitrates with nitrobenzoic acid (NBA), naphthalene-2,6-disulfonic acid (26 NS), and naphthalene-2-sulfonic acid (2 NS) salts, respectively. Typically, 2.5 g of the CaAl LDH compound were dispersed in 250 ml 0.1 M aqueous solutions of organic salts. The mixtures were allowed to react for 16 h, under nitrogen and vigorous stirring at 65-70° C. The controlled release formulations were isolated by filtration and washed thoroughly with distilled water and acetone several times. They were then dried under vacuum for 4 hours at 100° C. A similar method may be used to produce CADisal, which is Disal™ intercalated in a CaAl LDH. Disal™ is a commercial superplasticizer.

Example 2

Characterization of Controlled Release Formulations

Powder X-ray diffraction (XRD) was performed on a Scintag XDS 2000 X-Ray diffractometer using Cu—Kα radiation at 45 kV and 35 mA between 4 and 65° (2θ with a graphite secondary monochromator). FTIR spectra were recorded on a Bohmem MB 100 instrument. Thermal analyses on powder samples (10-20 mg) were carried out using a Seiko simultaneous thermal analyzer (STA) TG/DTA320 in flowing Ultra zero air (150 mL/min) at 20° C./min from room temperature to 1000° C. Scanning electron microscopy and chemical analyses (SEM/EDX) were conducted using a Cambridge Systems Stereoscan™ 250 instrument equipped with an Oxford Instruments Inca™ 200 EDS.

X-ray Diffraction (XRD) Analysis

Ca/Al (molar) ratio found for the CaAl LDH by EDS (energy dispersive spectroscopy) was equal to 2, suggesting the following formula: $Ca_2Al(OH)_6NO_3.mH_2O$. The diffraction pattern for the synthetic material CaAl LDH (FIG. 1) shows a typical layered structure with high crystallinity, similar to those previously reported in the literature for LDH-like materials. For the frequently occurring carbonate form of LDH, the basal spacing represented by the reflection at approximately 10° (2θ) in the XRD profile is usually equal to 0.78 nm, whereas the nitrate form has a basal spacing of 0.88 nm. The value of the basal spacing (0.86 nm) corresponds to the sum of the thickness of the $[Ca_2Al(OH)_6]^{2+}$ layer (0.48 nm) and of the interlayer space occupied by the anion, whose ionic diameter, in the case of nitrates, is about 0.38 nm. This is in agreement with the predicted value for the basal spacing, considering a planar orientation of anions, mainly nitrates, and water molecules within the interlayer space of LDH-like materials (FIG. 2).

Figure 2:
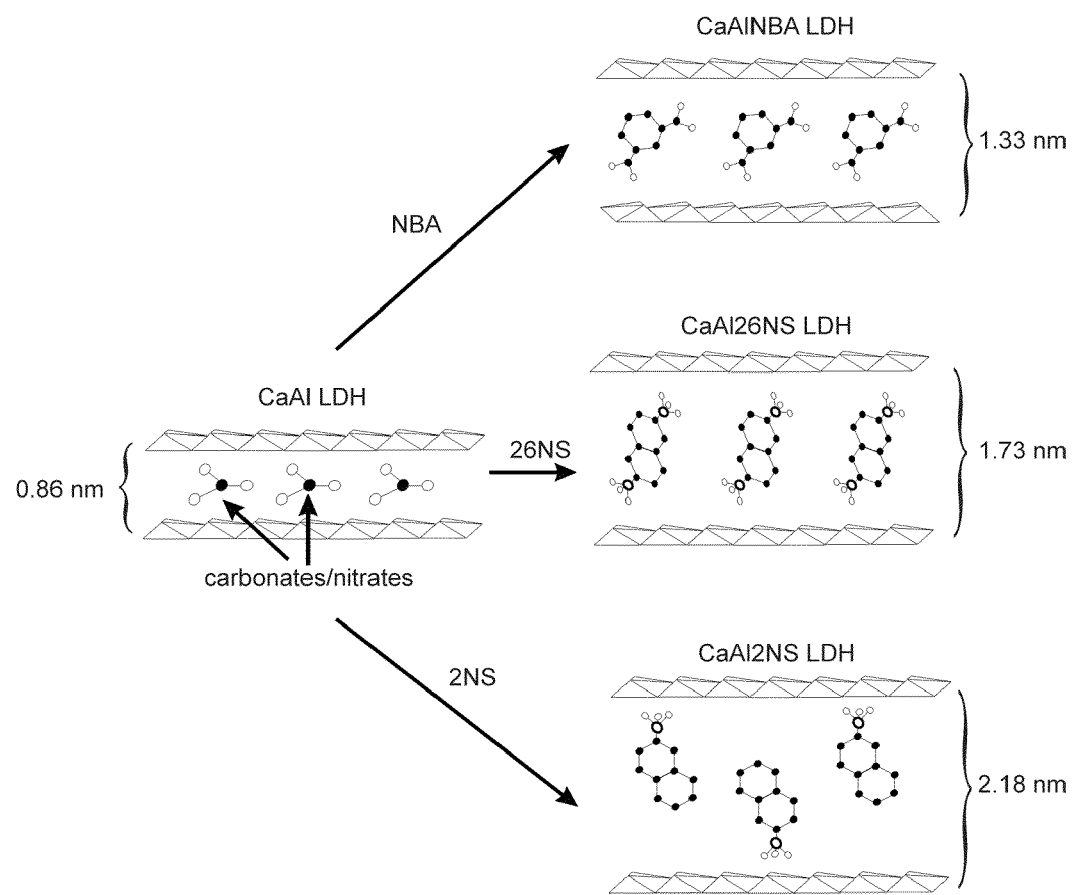
FIG. 2 depicts a schematic diagram of organic molecules intercalated in synthetic LDHs.

The reaction of CaAl LDH with NBA, 26 NS, and 2 NS salts produces materials whose diffraction patterns are given in FIG. 1. The intercalation between the layers of CaAl LDH samples is confirmed by an increase in the basal spacing, the value of which represents the sum of the thickness of the inorganic layer (0.48 nm) and interlayer space (Table 1).

TABLE 1

| | anion size (nm) (CPK) | basal spacing (nm) | RT-200° C. weight loss % | 200-450° C. weight loss % | 450-1000° C. weight loss % |
|---|---|---|---|---|---|
| CaAl LDH | 0.38 | 0.86 | 9.8 | 17.5 | 16.8 |
| CaAlNBA LDH | 0.61 | 1.33 | 7.7 | 21.6 | 8.9 |
| CaAl26NS LDH | 1.26 | 1.73 | 12.2 | 18.0 | 25.1 |
| CaAl2NS LDH | 0.86 | 2.18 | 9.9 | 14.1 | 28.9 |

The results for CaAlNBA LDH and CaAl26NS LDH show that the interlayer space available cannot accommodate NBA and 26 NS molecules based on their respective anionic size measured on a CPK model (see Table 1). Therefore, the values obtained for the interlayer spacing could be explained by either a grafting of the anions on the hydroxylated inorganic layers or by tilted orientations of the molecules with respect to the double hydroxide layers. The first hypothesis is unlikely to be true because the thermal analysis (Table 1) does not show any high thermal stability of the organic derivatives compared with the starting material, CaAl LDH. For both CaAlNBA LDH and CaAl26NS, the organic molecules can only orient themselves slightly tilted with respect to the oxide layers (FIG. 2). Conversely, the CaAl26NS LDH shows an interlayer space concurring with the 26 NS molecules lying in a perpendicular head-to-tail bilayer arrangement towards the oxides layers (FIG. 2).

Previous intercalation results in LDH-like materials have shown the propensity of this class of layered materials to incorporate organic anions in a perpendicular arrangement. Based on the anionic size of 26 NS (Table 1), it can be assumed that there are voids between the organic molecules themselves and between the anions and the hydroxide layers. These voids can connect to each other and can be partially occupied by water molecules. The presence of this intercalated water was confirmed by DTG data, which indicates the presence of two distinct desorption processes (physisorbed and intercalated water) from RT to 200° C. These observations are comparable with previously reported results for LDH.

Figure 3:
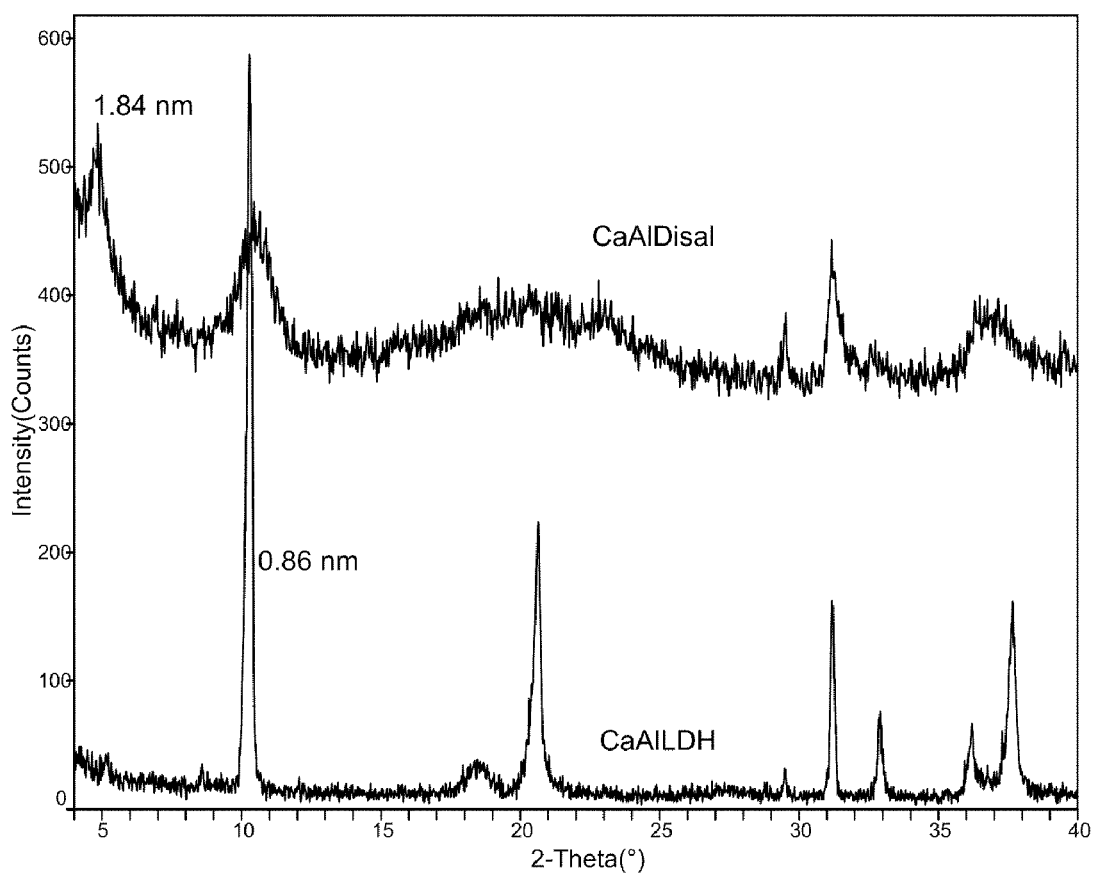
FIG. 3 depicts X-ray diffraction patterns for CaAl LDH and for CaAl LDH having Disal™ intercalated therein.

In the case of Disal™, the XRD pattern is shown in FIG. 3. The intercalation of Disal™ within the interlamellar space of CaAl LDH induced a "turbostratic" disorder as shown by the dissymmetry and enlargement of the peaks. It is also shown that upon intercalation of Disal™, the primary peak of the starting material (CaAlLDH) was shifted towards low angle values, which confirms an enlargement of the space between the inorganic double hydroxides CaAl layers (from d=0.86 nm for CaAl LDH to d=1.84 nm for CaAlDisal). The presence of Disal™ was also detected by means of FTIR analysis.

Thermal Analysis

Figure 4:
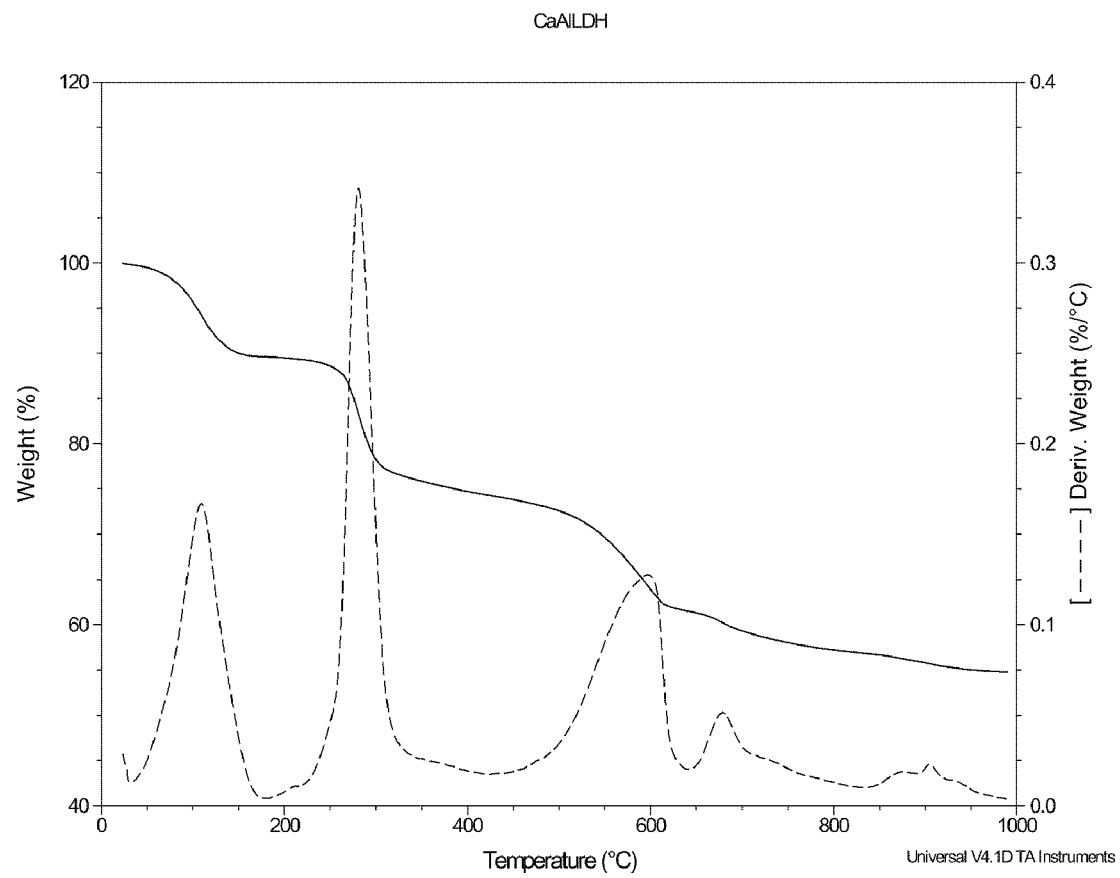
FIG. 4 depicts a TGA/DTG (thermogravimetric analysis/derivative thermogravimetry) curve for CaAl LDH.

The thermogravimetric analysis (TGA) curve of CaAl LDH is comparable with previous data of LDH-like materials. A typical TGA/DTG (thermogravimetric analysis/derivative thermogravimetry) curve is shown in FIG. 4. The results show an initial reduction in weight between RT and 200° C. arising from physisorbed and interlayer water. A second weight loss between 200 and 450° C. results from a concomitant dehydroxylation of the inorganic layers and a reduction of nitrates to nitrites. Beyond 450° C., a further condensation of hydroxyls and decomposition of nitrites have been observed as reported elsewhere. The corresponding DTG (derivative thermogravimetry) trace shows three main effects associated with these weight losses. Based on previous analysis and the suggested formula from the EDS analysis, $Ca_2Al(OH)_6NO_3 \cdot mH_2O$, the first weight loss corresponds to two water molecules (m=2 in the formula). The second (17.5%) and third (16.8%) weight losses, caused by a combination of structural water loss (dehydroxylation) and of nitrates decomposition, may be described by a combination of the evaporation of two water molecules and the decomposition of one nitrate ion, as follows:

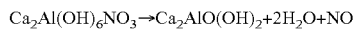

$$Ca_2Al(OH)_6NO_3 \rightarrow Ca_2AlO(OH)_2 + 2H_2O + NO$$

A summary of the weight loss data obtained from the thermogravimetric analyses of CaAl LDH, CaAlNBA LDH, CaAl26NS LDH, and CaAl2NS LDH is given in Table 1. In the case of the controlled release formulations, the weight loss between 450 and 1000° C. is attributed to a combination of two events: dehydroxylation of the Ca—Al hydroxide layers and decomposition of organic molecules. A temperature treatment beyond 600° C. caused a collapse of the layered structure for all compounds and gave rise to new crystalline phases (mixed oxides, e.g., spinel forms).

Infrared Analysis

Figure 5:
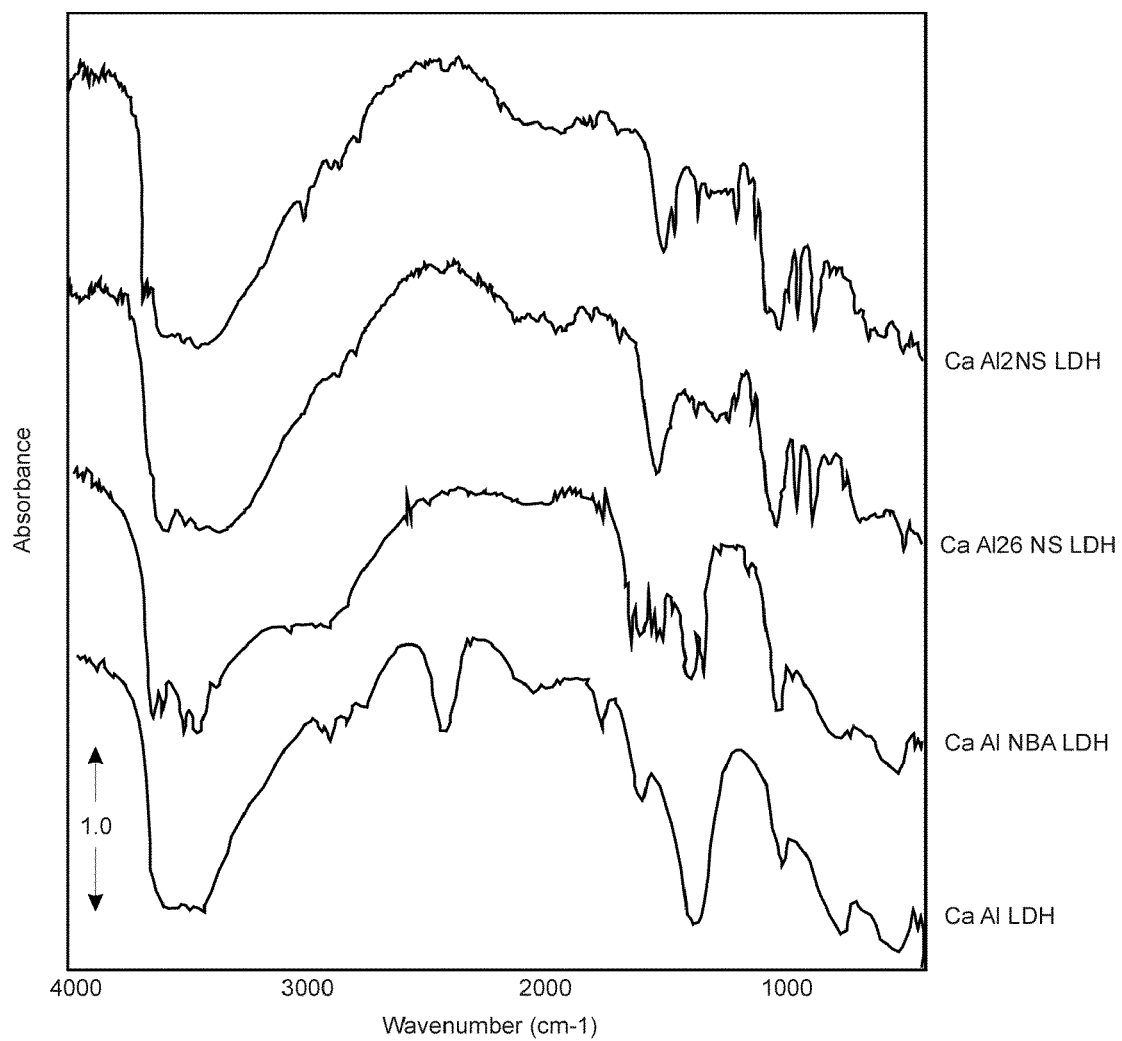
FIG. 5 depicts FT-IR spectra of CaAl LDH, CaAlNBA LDH, CaAl26NS LDH, and CaAl2NS LDH.

FTIR spectroscopy shows characteristic frequencies associated with the presence of intercalated anions. FIG. 5 shows the FT-IR spectra of CaAl LDH, CaAlNBA LDH, CaAl26NS LDH, and CaAl2NS LDH. In all samples, a broad band between 3600 and 3400 cm$^{-1}$ represents the stretching vibrations of the O—H groups of the inorganic layers and the interlayer water. Another common frequency for LDH-like materials is the presence of the bending vibrations of water molecules at 1600 cm$^{-1}$. In the case of CaAl LDH, the absorption centered at 1380 cm$^{-1}$ is assigned to the presence of nitrate anions within the structure. However, due to the broadness of this band, it may also correspond to the presence of carbonate ions, which usually occurs at 1360-1370 cm$^{-1}$. For the controlled release formulations, this region is dominated by absorption bands caused by C—H stretching vibrations in an aromatic ring. For CaAlNBA LDH, characteristic peaks of NBA were present in the spectrum, including antisymmetric and symmetric stretchings of $CO^{2-}$ in carboxylic acid salts (1610-1650 and 1400-1300 cm$^{-1}$, respectively), $NO_2$ symmetric stretching in aromatic nitro compounds (1360-1320 cm$^{-1}$), C—N stretching mode (920-830 cm$^{-1}$), and $NO_2$ bending vibration in aromatic compounds (580-520 cm$^{-1}$). In the case of both CaAl2NS LDH and CaAl26NS LDH, the main characteristic peaks are quite similar and comparable with previously published data. Intercalation of the naphthalene molecules is shown qualitatively by in- and out-of-plane ring bending absorptions (640-615 and 490-465 cm$^{-1}$, respectively), the aromatic ring C—C single and double bonds (690 and 1640-1490 cm$^{-1}$, respectively), and the S—O bonds of the sulfonate groups at 1170 and 1125 cm$^{-1}$. The presence of all these organic bands, combined with XRD results, confirms a successful intercalation reaction of NBA, 2 NS, and 26 NS within the interlayer space of CaAl LDH-like materials.

SEM/EDX

Figure 6A:
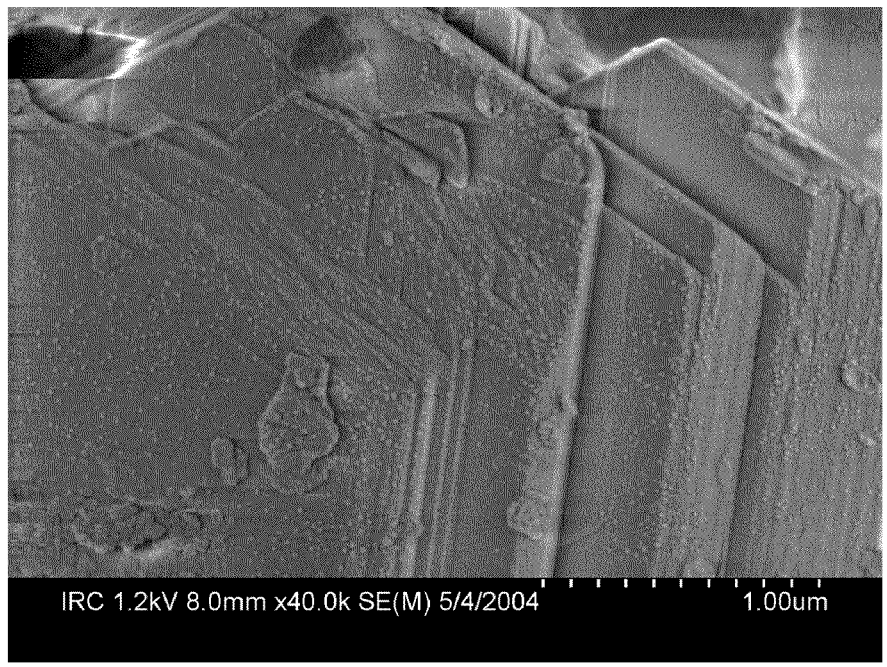
FIGS. 6a and 6b depict scanning electron micrographs (SEM) of CaAl LDH and CaAlNBA LDH.
Figure 6B:
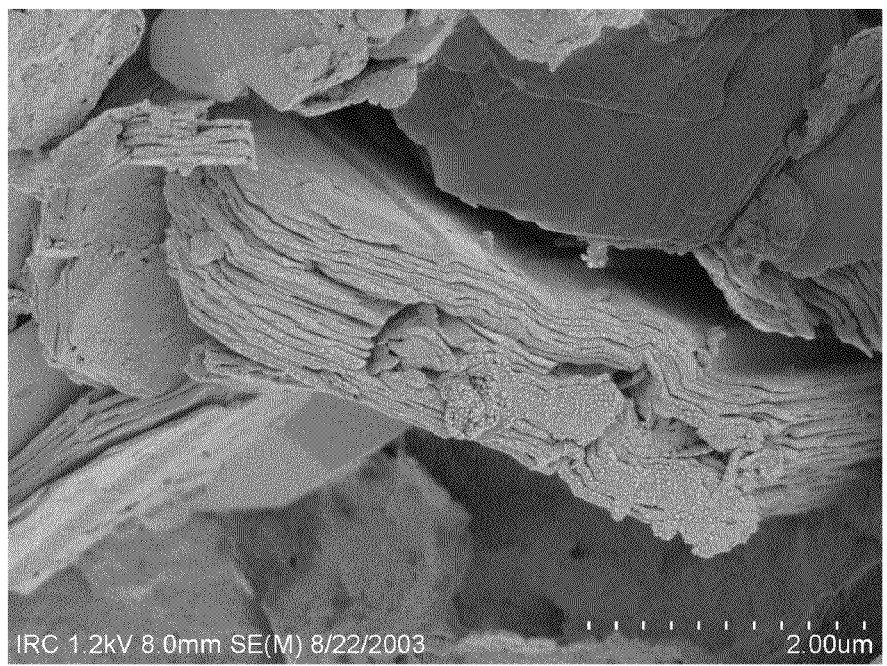

The comparison between the scanning electron micrographs (SEM) of CaAl LDH and CaAlNBA LDH (FIGS. 6a and 6b) shows that the former has well-formed and regular hexagonal-shaped particles stacked on top of each other, a characteristic of other lamellar phases in the groups of AFm phases and LDH-like compounds. In the case of CaAlNBA LDH, the material appears to be constituted of non-uniform, round-edged, hexagonal plate-like particles. The other two controlled-release formulations, CaAl26NS LDH and CaAl2NS LDH, show similar features. Possibly, the presence of organic molecules in the interlamellar space has produced a change of the superficial interaction between particles that influences the aggregation between particles. It is known that if slowly precipitated, hydrotalcite-like structures give hexagonal plates that display some edge rounding upon intercalation.

Conduction Calorimetry

Figure 7:
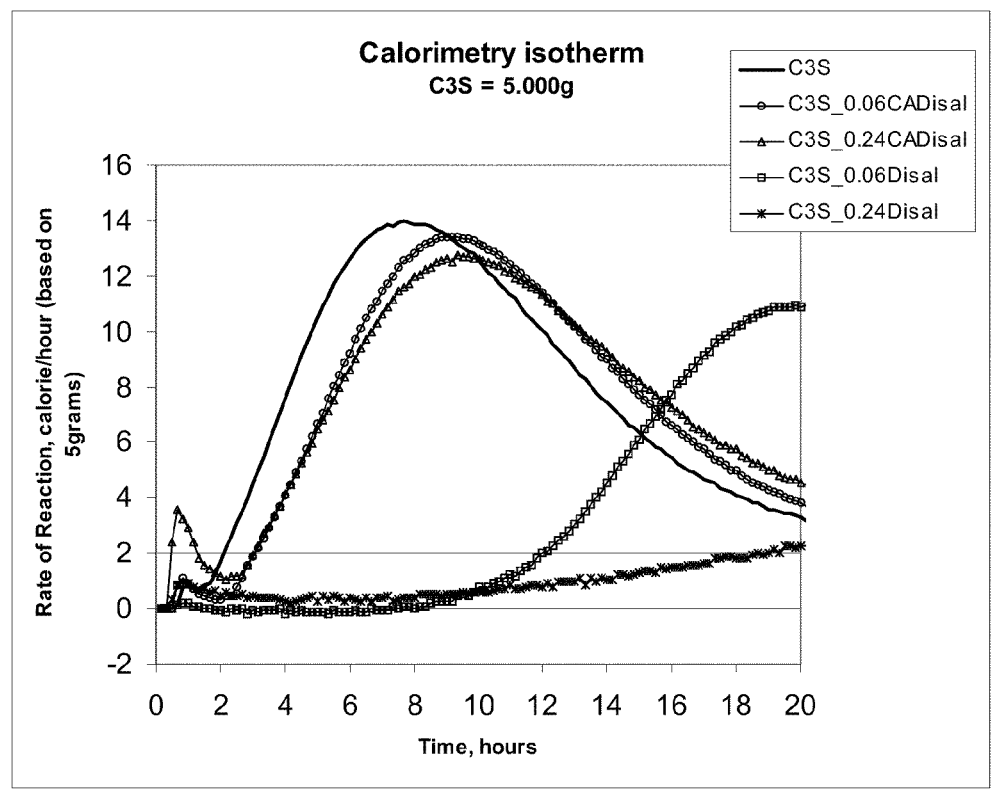
FIG. 7 depicts calorimetry curves for Disal™ and Calcium Aluminate Disal™ (CADisal)

Conduction calorimetry is used to monitor the hydration kinetics of cement pastes. FIG. 7 shows an evident effect of CADisal (Calcium Aluminate with superplasticizer Disal™) on the hydration kinetics of $C_3S$ (Calcium Trisilicate). A significant difference in the hydration kinetics was observed at both dosages of superplasticizer (Disal™) in the solid matrix (CA) (0.06 and 0.24).

It is well known that the addition of a superplasticizer to a concrete mix design induces some delay in the hydration process of cement. In this work, it is evident that the addition of pure Disal™ at both dosages (0.06 and 0.24) generated a delayed hydration as shown by the calorimetry curves in FIG. 7. When the composite additive is used instead of pure Disal, these curves are shifted indicating a significantly reduced retardation effect in the hydration kinetics of the cement in the mix, the net effect being comparable to the control sample ($C_3S$) hydration profile.

Example 3

Deintercalation of Controlled Release Formulations

In order to test the ability of the CaAl LDH to release the organic admixture, a series of experiments were undertaken on different compositions and under different experimental conditions, namely pH, charge density of CaAl LDH and concentration of the organic admixtures.

The deintercalation process was tested by exposing different formulations to a simulated concrete pore solution at room temperature. An example is described as follows:

An amount equal to 0.5 g of the formulation was added to an aqueous solution of NaOH. The mixture was stirred at room temperature for 15, 30, 60, 120 and 180 min. The resulting material was retrieved by vacuum filtration and drying at 65° C. overnight. Two different concentrations of NaOH were tested: 0.1 and 0.2 M.

Figure 8A:
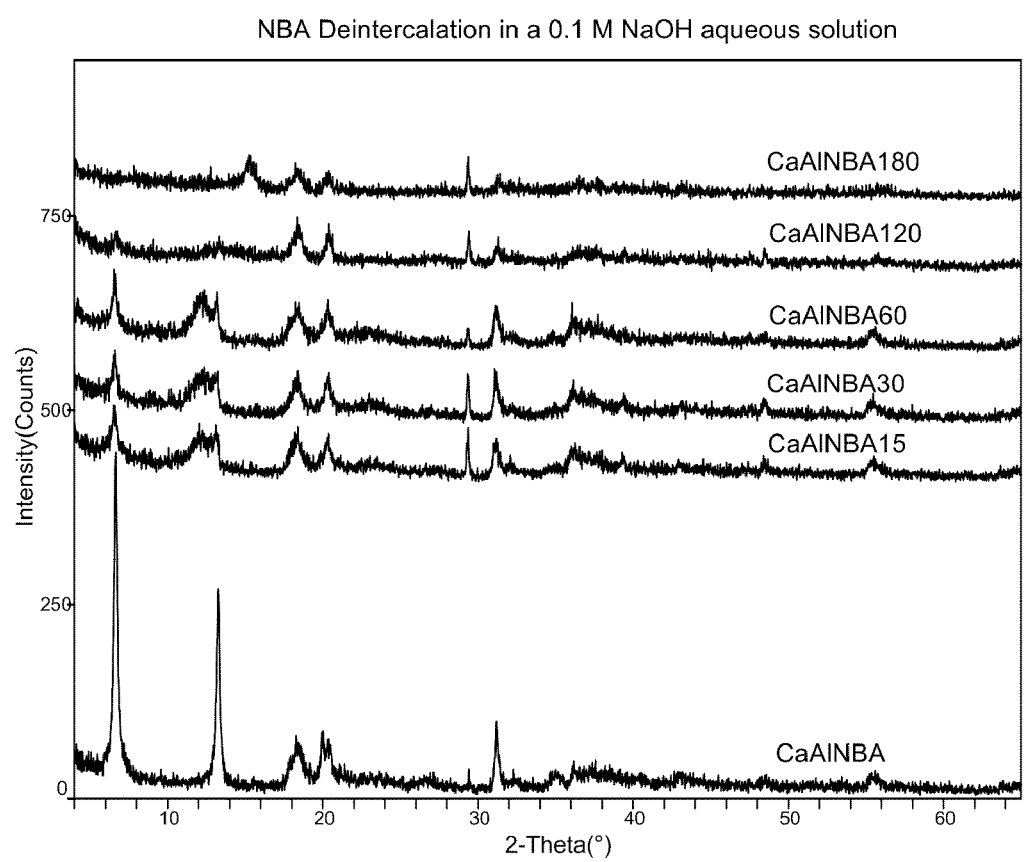
FIGS. 8a and 8b depict X-ray diffraction profiles of two deintercalation processes of nitrobenzoic acid (NBA)
Figure 8B:
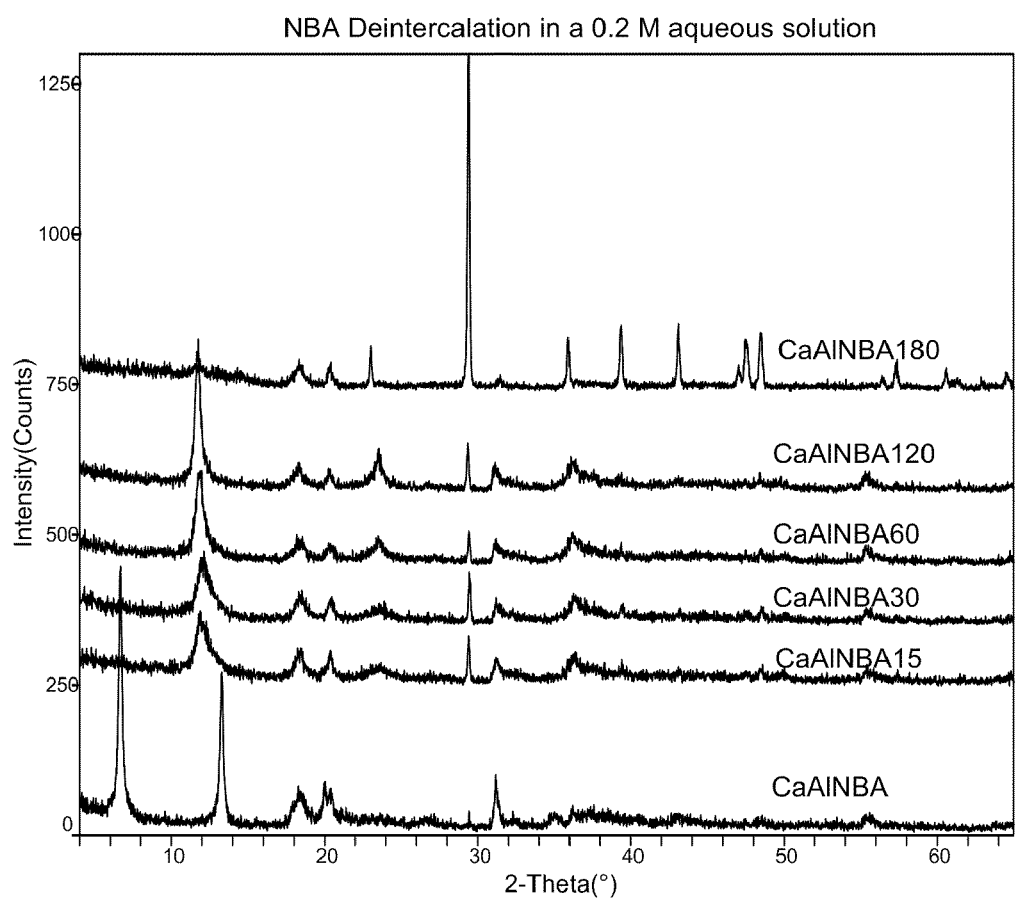

FIGS. 8a and 8b depict XRD profiles of two deintercalation processes of nitrobenzoic acid (NBA). FIG. 8a illustrates the release of NBA molecules in a 0.1M NaOH medium. It can be seen that the main peak (d=1.33 nm) in the starting formulation CaAlNBA gradually reduced in intensity giving rise to new peaks at $2\theta=11°$ and $29°$. These peaks correspond to the CaAl carbonated form and calcite respectively. The complete release of intercalated NBA was achieved after 180 min of stirring.

When CaAlNBA is stirred in the presence of 0.2 M NaOH aqueous solution, the deintercalation process was faster. As shown in FIG. 8b, the major peak at 1.33 nm vanished completely after 15 min of stirring. This result confirms the release of NBA molecules from the structure. The CaAlNBA15 showed new peaks at around $2\theta=11°$ and $29°$, which are due to the presence of the carbonatated form of CaAlLDH and calcite respectively. Both phases were confirmed by FTIR analysis. The process of deintercalation can be explained by an exchange reaction between intercalated NBA molecules and different ions present in the basic solution such as carbonates and hydroxides. The carbonated form was very predominant as the mixing process was done in air. It is known that LDH-like compounds are easily contaminated by carbonates when no special conditions (e.g. $N_2$ environment) are taken during the synthesis.

As the time of mixing reached 180 min, the layered character of the original LDH disappeared completely and was replaced by the presence of peaks assigned to $Al(OH)_3$ and $CaCO_3$, as a result of calcium and aluminum ion leaching.

Example 4

Testing of the Controlled Release Formulations in Cement-based Compositions

Different paste, mortar and concrete mixes were prepared and slump loss measured using the mini-slump technique (D. L. Kantro "Influence of Water-Reducing Admixtures on Properties of Cement Pastes: A miniature Slump Test", Cement, Concrete, and Aggregates, Vol. 2, No. 2, Winter 1980, pp. 95-102) (paste and mortar), and the standard slump method for concrete (ASTM Test C143-90a "Standard Test Method for Slump of Hydraulic Cement Concrete").

In this example, the organic admixture was a sulphonated naphthalene formaldehyde-based superplasticizer, called Disal™. The controlled release formulation (CADisal) was synthesized in a manner as described in Example 1.

The effectiveness of Disal™ alone in controlling the slump-loss versus time characteristic was compared to that of the controlled release formulation CADisal. A normal Portland Type 10 cement was used unless otherwise indicated. A standard Ottawa, Ill. ASTM C778 grade sand was used for mortar and concrete mixes. Aggregates passing a 10 mm sieve were added to the concrete mixes.

4A: Cement Pastes

Cement paste control specimens were prepared and mini slump measurements taken. The following test sequence was used.

Pastes with a water-cement (w/c) ratio of 0.50 were produced having a Disal™ dosage of 0.3% by mass of cement. A mini-slump cone (d(top)=19.1 mm; d(bottom)=38.1 mm; h=57.2 mm) was used for slump measurements. The following mixing sequence (2 min stirring; 3 min standing; 2 min stirring) was employed. Slump-loss vs. time curves with 1 min mixing after each interval of storage were produced.

Cement paste specimens containing CADisal were also produced by adding the CADisal to cement to form a mixture, and then adding the mixture to water with mixing. The same procedure as described above was used to produce slump-loss vs. time curves for CADisal. The dosage of CADisal was 2.4% by mass of cement and the w/c was 0.5.

Figure 9:
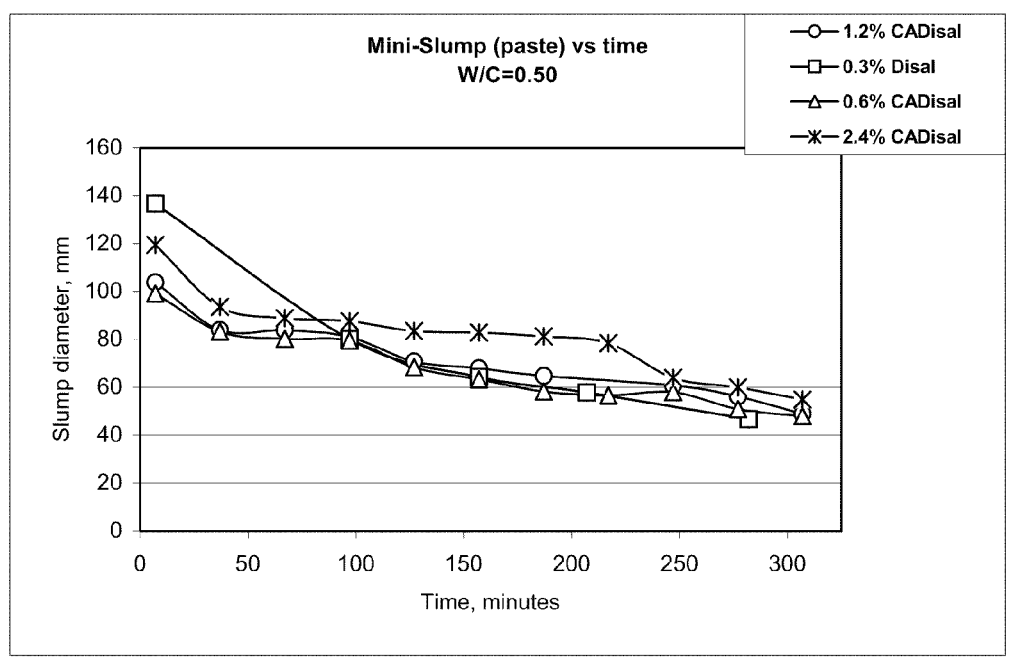
FIG. 9 depicts a plot of slump loss of cement pastes produced with Disal™ alone and with a controlled release formulation (CADisal) of the present invention as a function of mixing time at room temperature.

FIG. 9 is a plot of the slump loss of cement pastes produced with Disal™ alone and with the controlled release formulation (CADisal) as a function of mixing time at room temperature. As shown on the plot, the slump loss of cement paste produced with pure Disal™ and with the controlled release formulation with respect to the elapsed time indicates that both samples have the same trend (steep slump loss) up to 30 min for CADisal and up to 100 min for pure Disal™. It is important to notice that when CADisal is used (especially for 2.4% Disal™), the magnitude of slump loss is considerably slower (due to controlled release) than when pure Disal™ is added to the mix. Overall, the plot indicates that the controlled release formulation (2.4% Disal™) provides a longer time for the superplasticizer to keep cement workability at a reasonable level after mixing.

After 30 min of mixing, the workability of the mix is almost steady (plateau) up to 210 min. After that, the mix starts to lose its consistency. This is a very important factor in concrete-making. Indeed, prolonged mixing in a truck mixer induces acceleration of stiffening of concrete and consequently an increased rate of the slump loss. The time that elapses in the course of mixing, delivering, placing, compacting, and finishing operations is considered to be a key parameter for slump loss. The direct consequence of this is difficulty in handling and placing, reduction of ultimate strength and decreased durability. The controlled release formulation of the present invention helps alleviate this difficulty.

4B: Mortars

Mortar control specimens were prepared and mini slump measurements taken. The following test sequence was used.

Mortars with a water—cement (w/c) ratio of 0.59 and a cement/sand (c/s) ratio of 1:2.75 (by mass) were produced. A modified cone for slump loss measurements (d(top)=37.5 mm), d(b)=75 mm; h=112.5 mm) was used. Disal™ dosage used was 0.3% by mass of cement. The procedure described above for the pastes was used for the mortar mixes.

Mortar specimens containing CADisal were also produced. The same procedure as described above to produce slump-loss vs. time curves was used. Three dosages of CADisal, 2.4%, 3.6% and 4.8% by mass of cement, were used and the w/c was 0.59.

Figure 10:
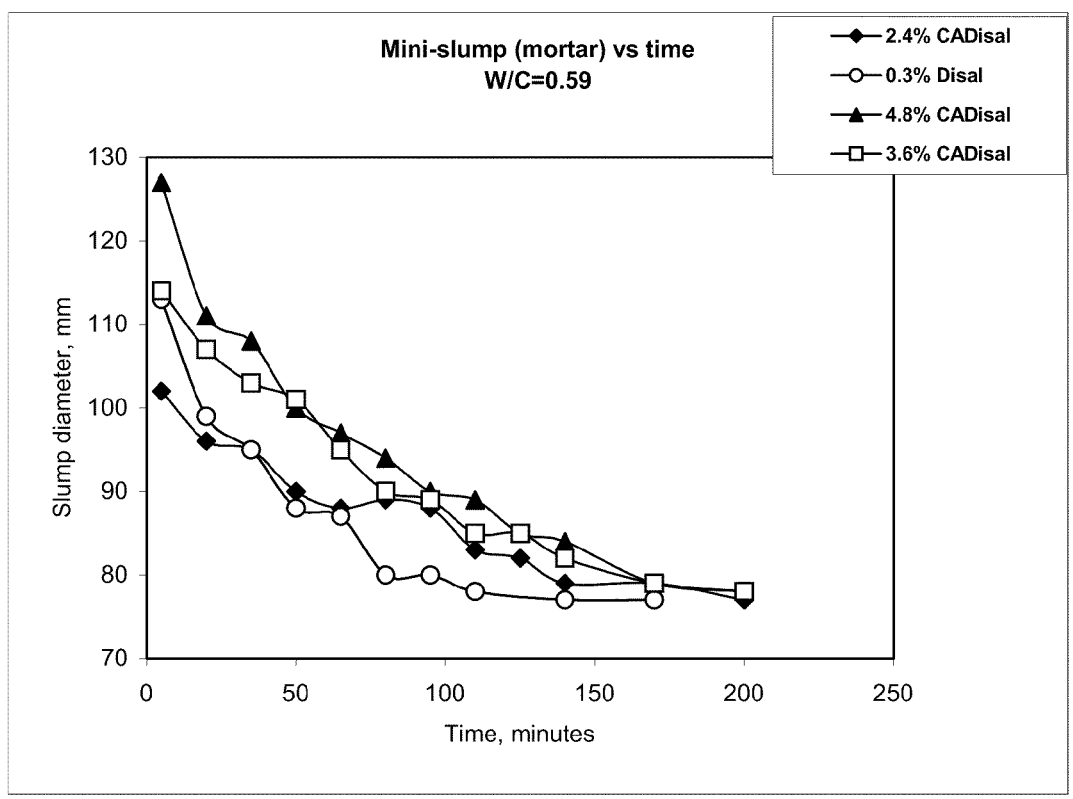
FIG. 10 depicts a plot of slump loss of mortars produced with Disal™ alone and with a controlled release formulation (CADisal) of the present invention as a function of mixing time at room temperature; and, FIG. 11 depicts a plot of slump loss of concretes produced with Disal™ alone and with a controlled release formulation (CADisal) of the present invention as a function of mixing time at room temperature.

The slump loss test results performed on mortar mixes containing pure Disal™ (control), and 2.4%, 3.6% and 4.8% of CADisal formulation are shown in FIG. 10. All the mortar samples lost slump with time. Clearly, the incremental loss in slump was more pronounced in the case of the control sample. While some differences were noted, the basic trends were similar for all samples including the controlled release formulation CADisal. They all showed a steady loss in slump with time. Increased dosage of CADisal induced an increased initial slump level. Nevertheless, the sample having 3.6% CADisal exhibited a substantial improvement in slump retention with time with an initial lump level comparable to the control sample. After about one hour, the measured value for the slump was 8.7 and 9.7 mm for the control and 3.6% CADisal samples, respectively. The control showed significant stiffening at 110 min while all the other mixes kept their workability until about 200 min.

4C: Concrete

Concrete control specimens were prepared and standard slump measurements taken. The following test sequence was used.

Concrete with a w/c of 0.59 and cement:sand:aggregate ratio of 1:2:3.2 (by mass) was used. Disal™ dosage was 0.3% by mass of cement. A standard slump cone (measurements of both height change and change in base area) was used. The test procedure described above for the paste and mortar samples was followed.

Concrete containing CADisal was also produced. The same procedure as described above to produce slump-loss vs. time curves was used. The dosages of CADisal were 2.4% and 3.6% by mass of cement and the w/c was 0.59.

Figure 11:
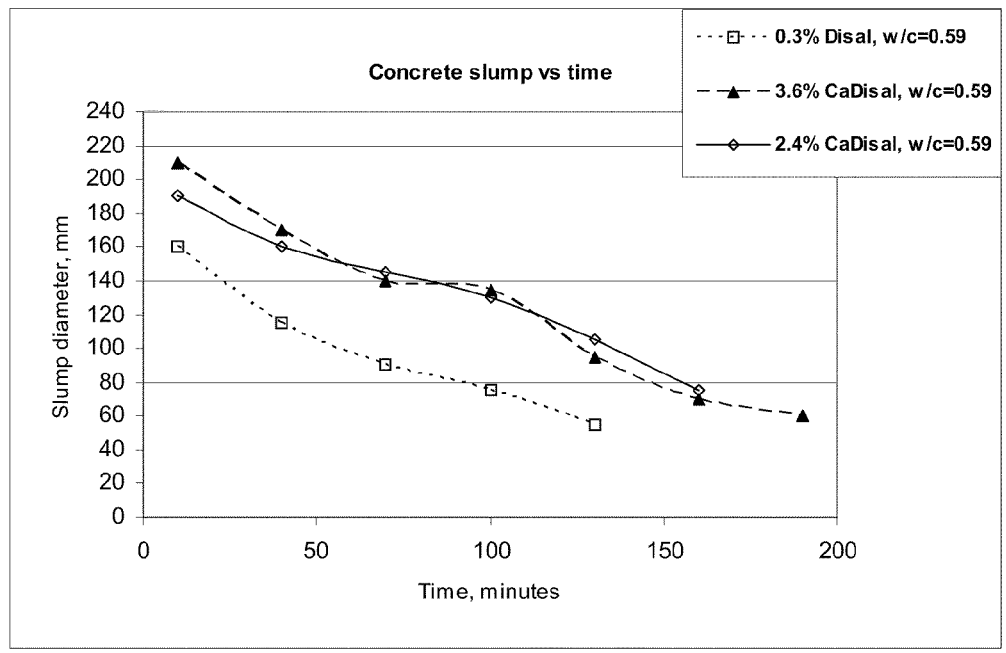

Curves depicting slump area versus time for different concrete mixes are given in FIG. 11. The control concrete mix with pure Disal™ shows a continuous loss in slump throughout the test with a more pronounced loss in the initial 50 min. It was observed that towards the end of the test, the mixture was starting to become stiff. In the cases of the concrete mix containing 2.4% and 3.6% CaAlDisal, initial slump values were higher than in the case of pure Disal. This behaviour may be due to a combination effect of both the CaLDH and the presence of Disal. Both samples at 2.4% and 3.6% showed a better control of slump loss with time, with a continuous decrease for 2.4% and a gradual decrease with a plateau for 3.6%. This trend is basically identical to what was observed with mortar mixes: a gradual loss up to 50 min, a plateau, and then a continuous decrease in slump. This behaviour was also clearly demonstrated with paste samples as they showed a better control for the release of the admixture compared to the control mix. Overall, regardless of CaDisal dosage, the effect of the controlled release formulation remains essentially the same for both samples.

LDH-based controlled release formulations of the present invention are effective for organic admixtures used in cement-based compositions, for example, accelerators (e.g. para and meta nitrobenzoic), retarders (e.g. ortho, para, and meta aminobenzoic acid), superplastcizers (e.g. naphthalene-2-sulfonate). The results have confirmed the effectiveness of the present formulations in controlling the workability of cement-based compositions, especially in respect of slump loss characteristics of pastes, mortar and concretes.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for controlling release of an admixture in a cement-based composition comprising first intercalating the admixture into a layered double hydroxide or mixture thereof to form a controlled release formulation and then adding the controlled release formulation to a cement-based material, the layered double hydroxide having formula (I):

$$[M^{2+}{}_{1-x}M^{3+}{}_{x}(OH)_2]^{x+}[A^{n-}{}_{x/n}.mH_2O]^{x-} \quad (I)$$

where $M^{2+}$ is $Ca^{2+}$, $M^{3+}$ is a trivalent metal cation, $A^{n-}$ is $NO_3^-$, $Cl^-$, $SO_4^{2-}$ or a mixture thereof, x is a number from 0 to 1 but not 0, n is a number 1 or greater, and m is a number 0 or greater.

2. The method of claim 1, wherein $M^{3+}$ is $Al^{3+}$.

3. The method of claim 1, wherein x is from 0.25 to 0.33.

4. The method of claim 1, wherein n is from 1 to 4.

5. The method of claim 1, wherein x is 0.25 and the admixture is present in the controlled release formulation in a concentration of 0.5 M or 0.7 M.

6. The method of claim 1, wherein the admixture is present in the controlled release formulation in a concentration of 0.05-1 M.

7. The method of claim 1, wherein the admixture is present in the controlled release formulation in a concentration of 0.5-0.7 M.

8. The method of claim 1, wherein the admixture comprises an accelerator for reducing set time, a retarder for delaying set time, a superplasticizer, an air-entraining agent for freeze-thaw resistance, a corrosion inhibitor, an expansive admixture for minimizing shrinkage, a shrinkage reducing admixture, a water repelling admixture, a water reducer, an alkali-aggregate reaction inhibitor, or a mixture thereof.

9. The method of claim 1, wherein the admixture comprises an accelerator for reducing set time, a retarder for delaying set time, a superplasticizer, an air-entraining agent for freeze-thaw resistance, a corrosion inhibitor, an expansive admixture for minimizing shrinkage, a shrinkage reducing admixture, a water repelling admixture, a water reducer, an alkali-aggregate reaction inhibitor, or a mixture thereof.

10. The method of claim 9, wherein the admixture comprises a superplasticizer.

11. The method of claim 9, wherein the admixture comprises a sulphonated naphthalene formaldehyde-based superplasticizer.

12. The method of claim 9, wherein the admixture comprises an alkali-aggregate reaction inhibitor comprising a lithium-based salt.

13. The method of claim 1, wherein the cement-based material comprises cement, mortar or concrete.

14. The method of claim 1, wherein the cement-based material comprises Portland cement.

15. A method for controlling release of an alkali-aggregate reaction inhibitor comprising a lithium-based salt in a cement-based composition, the method comprising first intercalating the alkali-aggregate reaction inhibitor into a layered double hydroxide or mixture thereof to form a controlled release formulation and then adding the controlled release formulation to a cement-based material, the layered double hydroxide having formula (I):

$$[M^{2+}{}_{1-x}M^{3+}{}_{x}(OH)_2]^{x+}[A^{n-}{}_{x/n}.mH_2O]^{x-} \quad (I)$$

where $M^{2+}$ is a divalent metal cation, $M^{3+}$ is a trivalent metal cation, $A^{n-}$ is $NO_3^-$, $Cl^-$, $SO_4^{2-}$ or a mixture thereof, x is a number from 0 to 1 but not 0, n is a number 1 or greater, and m is a number 0 or greater.

16. The method of claim 15, wherein $M^{2+}$ is $Ca^{2+}$ and $M^{3+}$ is $Al^{3+}$.

* * * * *